United States Patent [19]

Thompson

[11] 3,974,432
[45] Aug. 10, 1976

[54] CONTROL SYSTEM FOR REPETITIVE PROCESSES

[75] Inventor: Lionel Raymond Frank Thompson, Hatfield, England

[73] Assignee: Hawker Siddeley Dynamics Engineering Limited, England

[22] Filed: Jan. 23, 1975

[21] Appl. No.: 543,650

Related U.S. Application Data

[63] Continuation-in-part of Ser. No. 373,362, June 25, 1973.

[52] U.S. Cl. ............................... 318/562; 318/569; 318/603; 318/625; 328/75
[51] Int. Cl.² ......................................... G05B 11/32
[58] Field of Search ................... 328/48, 62, 72, 75; 318/569, 625, 603, 562; 340/172.5; 445/1

[56] References Cited
UNITED STATES PATENTS

| 3,719,926 | 3/1973 | Sangster et al. | 318/569 |
|---|---|---|---|
| 3,757,187 | 9/1973 | Arai | 318/562 |
| 3,760,251 | 9/1973 | Posi et al. | 338/601 |
| 3,766,407 | 10/1973 | Hegendorfer | 307/223 |
| 3,774,056 | 11/1937 | Sample et al. | 307/293 |
| 3,792,332 | 2/1974 | Fuller | 318/562 |
| 3,801,835 | 4/1974 | Tasso | 307/293 |
| 3,821,624 | 6/1974 | Iadipaolo et al. | 318/603 |
| 3,829,784 | 8/1974 | Eshraghian | 328/130 |
| 3,876,950 | 4/1975 | O'Connor | 328/130 |
| 3,889,238 | 6/1975 | Sakurai | 340/172.5 |

*Primary Examiner*—Gene Z. Rubinson
*Assistant Examiner*—John J. Feldhaus
*Attorney, Agent, or Firm*—Rose & Edell

[57] ABSTRACT

In a process control system for machines operating according to a repetitive cycle, with a number of machine events occurring in appropriate mutual phase relationship during the cycle, transducers are employed in association with rotating parts of the machine to generate reference pulses, one at the end of each complete cycle, and a large number of marker pulses equally between consecutive reference pulses. The marker pulses drive a counter which is reset to zero by each reference pulse; and at each count increment the count is compared with he whole contents of a memory in which is stored count numbers constituting data as to the points in the machine cycle at which particular events are to commence and terminate, with output stages responsive to the comparator and the memory addressing control giving output control signals when number identity is recognized.

9 Claims, 5 Drawing Figures

CONTROL SYSTEM FOR REPETITIVE PROCESSES

CROSS REFERENCE TO RELATED APPLICATION

This application is a continuation-in-part of Application Ser. No: 373362 filed June 25, 1973.

This invention relates to improvements in control systems for industrial processes and is particularly concerned with the provision of means whereby apparatus performing a cyclically repetitive function in an industrial process may be controlled.

In many industrial processes there is a requirement for the control of a plurality of functions within a repetitive cycle. It is also frequently required that the phasing of these functions within the cycle can be easily modified on demand without either stopping the process or causing a change in the sequence of the functions in such a way as to produce an undesirable disturbance in the operation of the process.

It is an object of this invention to achieve a control system, which will have features enabling it to control a process in such a way that the process can be modified whilst running without causing such difficulties. By way of example, the invention will be described in its application to the control of glass forming apparatus.

In a glass forming apparatus, expressed in simple terms, it is necessary to produce successive gobs of glass from a stream running in a gallery the size of each gob being determined by the opening of a plunger valve, to separate the gobs by mechanical shears, to direct the gobs to number of different moulds, to blow the glass in a first mould, to remove the partly formed glass container from this first mould and invert it into a second mould, where further counter blowing takes place, and to eject from this second mould out of the machine on to a conveyor belt to take the finished product from the apparatus.

Glass forming machines are normally made up of a number of sections, each carrying out a number of similar sequential processes but phase displaced from each other with respect to a reference point for the complete machine cycle. If it were possible to make the mechanics of each section of a machine identical and also the transit time of the glass gobs the same for each section, then the control of such a machine could be achieved by producing for one section a number of control events to correspond to the number of steps in the glass forming process of that section and then repeating the same sequence but phase displaced with respect to the machine cycle for the other sections.

However, such an ideal situation does not occur in production since each section of the machine will have different amounts of wear, and different tolerances, and it becomes necessary to modify the timing, expressed as an angle of the complete machine cycle, of each event by a small amount as the machine is running and the operation of the machine and the quality of the product is observed.

It has been common practice to time the events of such a multi-section machine by the position of a plurality of studs on a rotating drum such studs being so positioned that they will operate valves to effect machine operations at the appropriate points in the machine cycle. To modify the timing of any event has thus required the movement of said studs around the periphery of the rotating drum. This is only practicable whilst the machine is stopped or running slowly and at best can only give a crude approximation to the ideal setting leading to the desired timing.

According to the present invention, such mechanical timing drums are no longer used but instead the process control system comprises two transducers each responsive to a rotating machine member to generate electrical pulses, the first transducer generating a single reference pulse for each complete machine cycle and the second transducer generating a large number of marker pulses at equal short intervals between consecutive reference pulses, a counter driven by the marker pulse output of the second transducer, a memory to store the count numbers at which specific machine events are to occur, interrogation means interrogating the whole memory upon the occurrence of each marker pulse, comparator means comparing the memory output when so interrogated with the instantaneous count value in the counter, and a series of output stages arranged to deliver output signals for initiating machine events according to the coincidence of number values in the counter with stored values from the memory, the pulses from the first transducer being employed to reset the counter at the end of each complete cycle.

For the particular example cited it would be typical that there are 3,600 marker pulses between consecutive main reference pulses which occur once per machine cycle. That is, one marker pulse is produced for every 0.1° of the complete machine cycle.

Every machine event or function can be so set that it will commence at the time of a marker pulse and finish at the time of another marker pulse. Since the marker pulses are angle based with respect to machine cycle rather than time based it will be seen that the sequence and pattern of all the events within a machine cycle will be constant irrespective of actual machine speed.

The arrangements of the control system may be as follows:

The marker pulses taken from the machine reference shaft are fed into an electronic counter which is reset to zero at the occurrence of each main reference pulse taken from the machine reference shaft once per machine cycle. At any time the total number of marker pulses held in the counter represents the particular instantaneous phase angle of the whole machine. The number setting of the required start and finish of each machine event or function occurring during the complete process is held in a machine memory. Each time a marker pulse increments the counter by one, the memory is interrogated completely and the required state of each event is ascertained and the output means controlling events in the machine changed if appropriate. The memory can take the form of mechanical switches, one set for the start and finish of each event or function, or more preferably, it can be an electronic store, for example, a magnetic core store. When mechanical switches are used, it is necessary to ensure that, when any change of setting is made whilst the machine is operating, such change is effected whilst the number in the main counter is different from the existing setting or the new setting or any value of setting between the original one and the new one. This requirement presents certain difficulties when decade type switches are used.

The problem is much more easily overcome when a core store is used since electronic gating can be employed and so arranged that when the new setting is entered into the core by a manual key-board or a management computer the change will only take place at a safe time.

The main components of the control system are:
a. A pulse generator coupled to a reference shaft on the apparatus being controlled, giving a series of fine marker pulses and a machine cycle reference pulse.
b. An electronic counter of capacity at least equal to the number of marker pulses in a complete machine cycle.
c. A memory unit, which may be a core store, of sufficient capacity to hold all the start and finish data for each machine event or function.
d. Electronic means for interrogating the store at each counter increment and comparing the value of each event start or finish in the store with the number in the counter.
e. Means for 'signalling' the output states, either 'on' or 'off', for each event or function as determined by the comparisons of the number in the counter with the data in the store.
f. Means for coupling said output signals in such a way as to control the appropriate machine event or function of the apparatus.

Although the control system has been described in relation to a glass making apparatus, it is also applicable to any controlled process where reference signals are obtainable from the apparatus used in the process and events or functions are to be controlled having a specific phase relationship to the complete cycle of the apparatus or process.

One embodiment of the invention will now be described by way of example with reference to the accompanying drawings in which.

Figure 1:
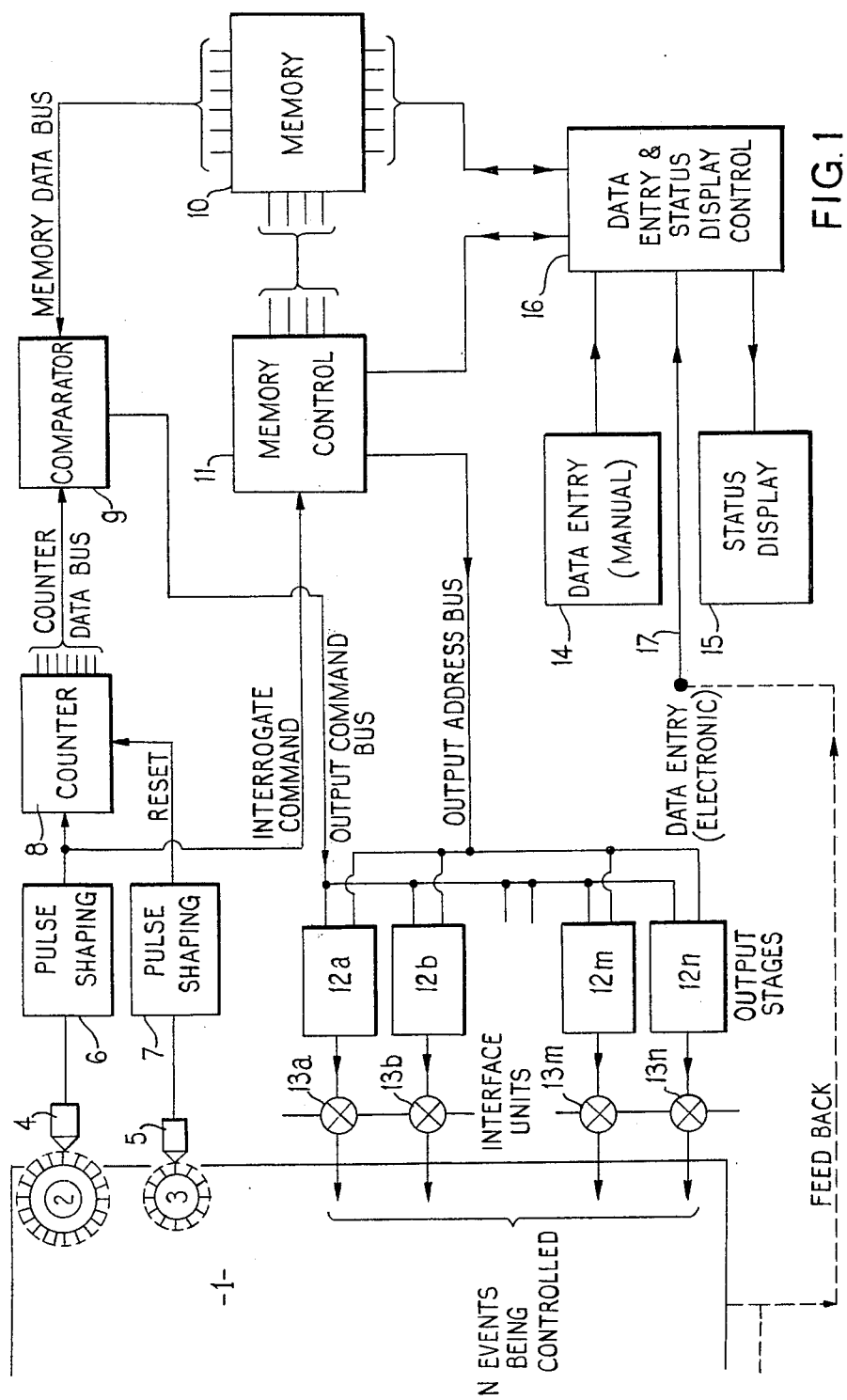
FIG. 1 is a block diagram of the control system to be described.

The machine being controlled 1 has a cycle of operation which embraces a number of events or functions to be controlled up to a quantity of N. Also associated with the machine being controlled 1 are two rotating shafts 2 and 3 so arranged and coupled to the machine that a series of fine marker signals can be obtained from shaft 2 giving an integral number of pulses per machine cycle, and one reference pulse per machine cycle can be obtained from the second shaft 3. These rotating shafts 2 and 3 can be separate or both types of pulse can be obtained from a single shaft. Two pulse transducers 4 and 5 produce electronic pulses during the rotation of the two shafts 2 and 3 respectively. These transducers 4 and 5 may be of the electromagnetic impulse type, or photo-electric, or electromagnetic proximity switches, or mechanically operable switches.

The electrical signals produced by the transducers 4 and 5 are electronically shaped in shaping circuits 6 and 7 to produce well defined electronic pulses suitable for coupling into the remainder of the electronic equipment of the control system.

The shaped pulse signal from the circuit 6 is coupled to two other circuit means, namely, an electronic counter 8 and a memory control unit 11. The counter 8 is of capacity at least equal to the number of fine marker pulses which will be produced in a complete machine cycle. The pulse signal from circuit 7 is arranged to reset the counter 8 every time the cycle reference pulse occurs. This feature is to ensure that the same number in the counter represents the same instantaneous angle of the machine operational cycle during each successive cycle. This is particularly necessary during the start up procedure for the machine and the control system. After start up, and the machine being controlled having moved through a first complete cycle, then the number in the counter is forced to become representative of the instantaneous machine cycle angle. Data representing the number in the counter 8 is presented to a comparator 9 into which is also fed data from the memory 10 for comparison purposes.

At the occurrence of every fine marker pulse from circuit 6 a command signal is fed to the memory control unit 11 to instigate a full interrogation of the memory unit 10. During this interrogation process all the data words in all appropriate locations in the memory 10 are presented sequentially to the comparator 9 where they are compared in turn with the number currently standing in the counter 8. The outputs from the comparator 9 are fed to all the output stages 12a to 12n of the control system, and concurrently signals representing the addresses of each of the output stages 12a to 12n are fed to such stages from the memory control unit 11 sequentially in such manner that the setting of each individual output stage is made appropriately either 'on' or 'off' whenever the number set in the counter 8 at that instant in time corresponds to an individual value set in the memory 10 at the address location of that particular output stage. Every time the counter 8 is incremented by one, this interrogation of the memory and the updating of the output stages is carried out. The output stages 12a to 12n have normally two states 'on' or 'off' and control valves 13a to 13n, one associated with each output stage, are controlled by the states of the output stages.

The valves 13a to 13n in turn control the events or functions within the machine using some suitable means, for example, pneumatic actuators, hydraulic acutators, electromagnetic actuators or electric motors. In the last two cases the valves 13a to 13n would take the form of electrical switches.

The system so far described assumes that the memory 10 is fully loaded with data, for example, a preprogrammed Read Only memory. If a memory unit of the read-write type is employed then manual data entry means 14, e.g. a keyboard, and status display panel 15, working in association with the data entry and status display control circuit 16, are employed to load the memory 10 with data or to modify the data in any particular location within the memory 10. The control circuitry 16 is also coupled to the memory control unit 11, and, generally, the first information entered from the manual entry means 14 will determine the particular address location for new data in the memory 10 via the memory control unit 11. The next information entered from the manual entry means 14 will be the actual data required to be lodged in the predetermined location in the memory 10. It is thus possible to load the memory 10 completely by use of the manual data entry control means 14. The status display means 15 shows the value of the data in the memory 10 at any location addressed by the data entry control circuitry 14 during manual data entry.

Figure 2:
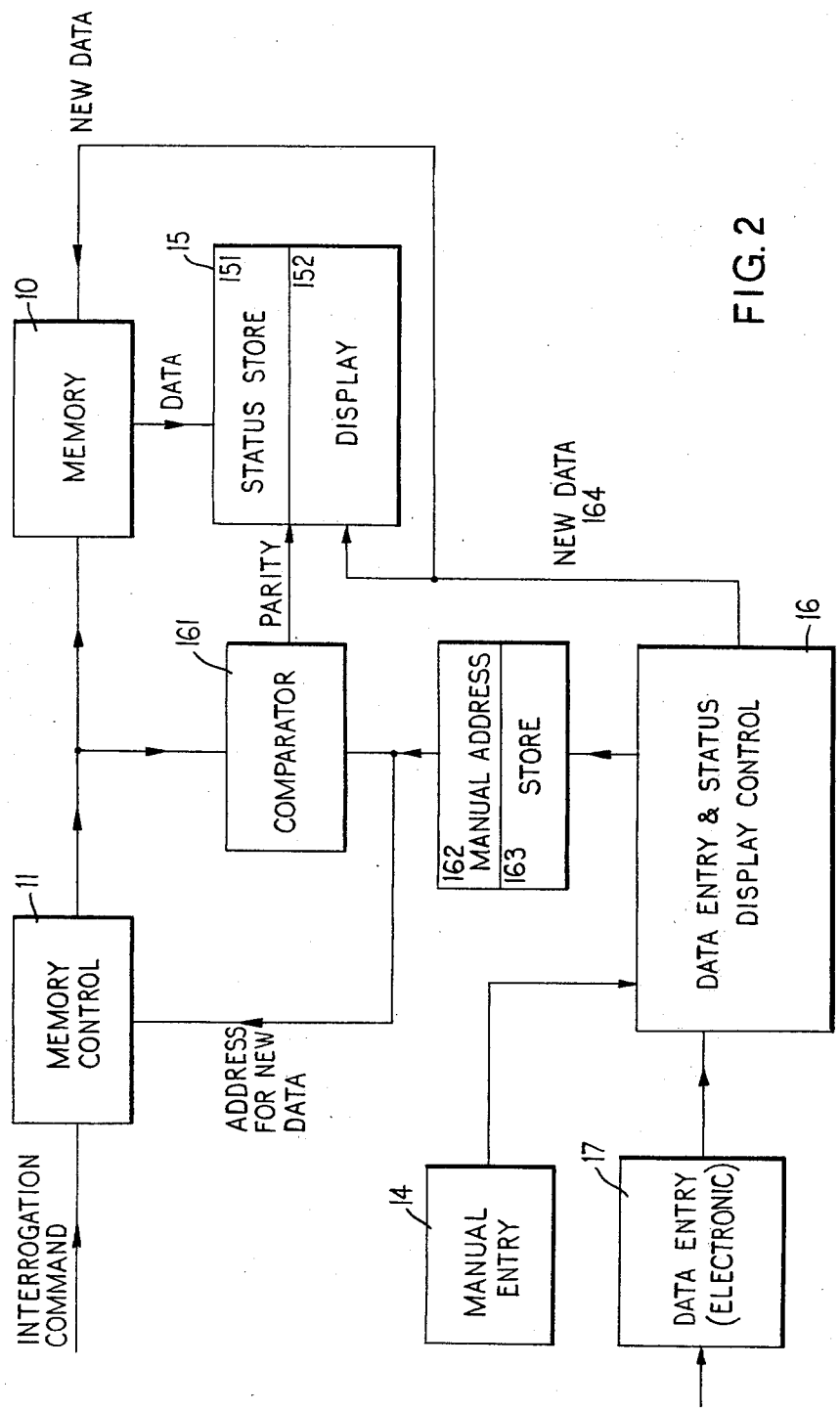
FIG. 2 is a block diagram illustrating the operation of status display means and the entry of new data into memory.

For a clearer understanding of the operation of the status display means and the method of entering new data into the memory, reference is made to FIG. 2.

The memory control 11 is continuously interrogated by the interrogate command line and requested to scan the memory means 10 completely. When it is required to display the contents of any particular location within the memory the address of that location is entered via the manual entry means 14. This information is routed into the data entry and status display control means 16 to form a number in the store means 163. This number is then transferred to the manual address store 162 and this address is compared with each address as generated by the memory control 11 by the comparator means 161. When parity occurs between the address generated by the memory control means 11 and the number in the manual address store 162 then a signal is passed to the status display means 15 such that the current number in the status store 151, which is the value of the data stored in the requested location of the memory means 10, is displayed on the display means 152.

In order to change the contents of the particular location in the memory means a further number can be entered through the manual entry means 14 then transferred via the data entry and status display control means 16 via a 'new data' line 164 to the memory where such number is overwritten into the required location. This new number is then transferred to the status store 151 to be displayed on the display means 152.

The alternative method of entering new data is to enter the required address on the manual entry means 14 which sets up an address in the manual address register 162 to activate directly the memory control means 11 so that the subsequent number entry on the manual entry means 14 is fed via the new data line 164 into the memory means 10.

Alternatively, information can be fed from an external source in the same order via the electronic data entry means 17 into the data entry and status display control 16 to operate in a similar way to that described above.

In addition to entry of data from the manual data entry means 14 it is possible to enter data into the memory 10 or interrogate data stored therein via a data entry line 17 using electronic signals. A typical source of these electronic signals could be a separate management computer. Such a separate management computer can also be used to modify the data in the memory 10 in any required location. An alternative method of entry of data via data entry line 17 is from a punched paper tape reader, a magnetic tape reader, either of a cassette type, cartridge type or reel type, or a magnetic drum or disc, or from any other bulk memory means.

Information ordered in a form giving address first followed by the required data, can be set up in management computer 172 and fed via the selector switch 176 into the data entry (electronic interface 171) to provide a signal on to the data entry (electronic means 17). When the selector switch 176 is moved to connect to the magnetic tape reader 173, or other source of data 174, then again information in the same order will be entered into the memory means 10 in the way previously described.

The expansion capability of this control system is only limited by the number of location cells within the memory 10, the cycle time of said memory and the frequency of the fine marker pulses generated by the transducer 4 when the machine being controlled 1 is running at its maximum rate. For example, for a machine having eight sections each involving thirty events or functions, each having a defined start and finish value, a memory having a cycle time of 1.6 microseconds, the use of two words of memory to define each operation of each event or function and 1,024 fine marker pulses developed by the transducer 4 per machine cycle, then the minimum time for each machine cycle would be approximately 3.3 seconds.

Referring again to the reset signal from the counter 8 emanating from the transducer 5 detecting the signal from the rotating shaft 3, it is desirable that the cycle time position of this reset pulse should be accurately located with respect to the fine marker pulses emanating from the transducer 4 and rotating shaft 2 and should not embrace more than one of said fine marker pulses. In order to achieve these stringent requirements, one technique which may be used is to make the rotating member 3 in two parts geared together and both generating reference pulses, the single transducer 5 being replaced by a two-part electronic transducer to detect the coincidence of these pulses which will occur at the required accurately determined point.

Figure 4:
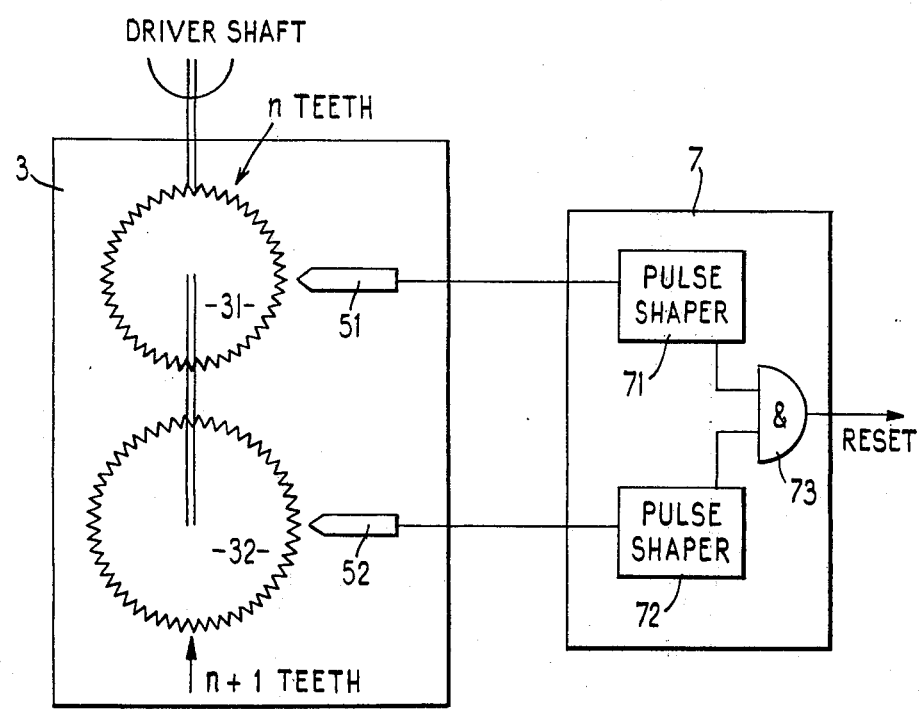
FIG. 4 is a diagram showing the electrical-pulse-generating transducer assembly in more detail.

For clearer understanding of the two part generator, reference is made to FIG. 4. A shaft which is rotating at a rate of one revolution per machine cycle and having a toothed wheel with $n$ teeth 31, is coupled to a second member 32 having $n + 1$ teeth. Two transducers 51 and 52 are associated with gears 31 and 32 respectively. Two pulses trains are generated by the transducers, that from transducer 51 producing a pulse per machine cycle and that from transducer 52 producing $n = 1$ pulses per machine cycle. The output signals from transducers 51 and 52 are modified by the pulse shaping means 71 and 72 respectively and the output signals are added in the 'and' gate 73 such that the signal produced by the 'and' gate 73 occurs once per machine cycle and is precisely timed with respect to all the fine marker pulses produced during the machine cycle. This signal is used to re-set the counter means 8. It will be appreciated that this accuracy of position results from the large number of teeth on each of two parts of the gearing 31 and 32.

For obtaining a high integrity in the performance of the system it may be desired that the counter 8 should be in two sections, both sections driven in parallel by the signals from the shaping circuit 6 with a comparator coupled between the two sections of the counter to check for coincidence of information in the two sections. Should this comparator detect a lack of parity between the two sections of the counter then a control signal would be generated such as to inhibit further operation of the complete system and if necessary initiate some form of visual or audible warning.

Figure 5:
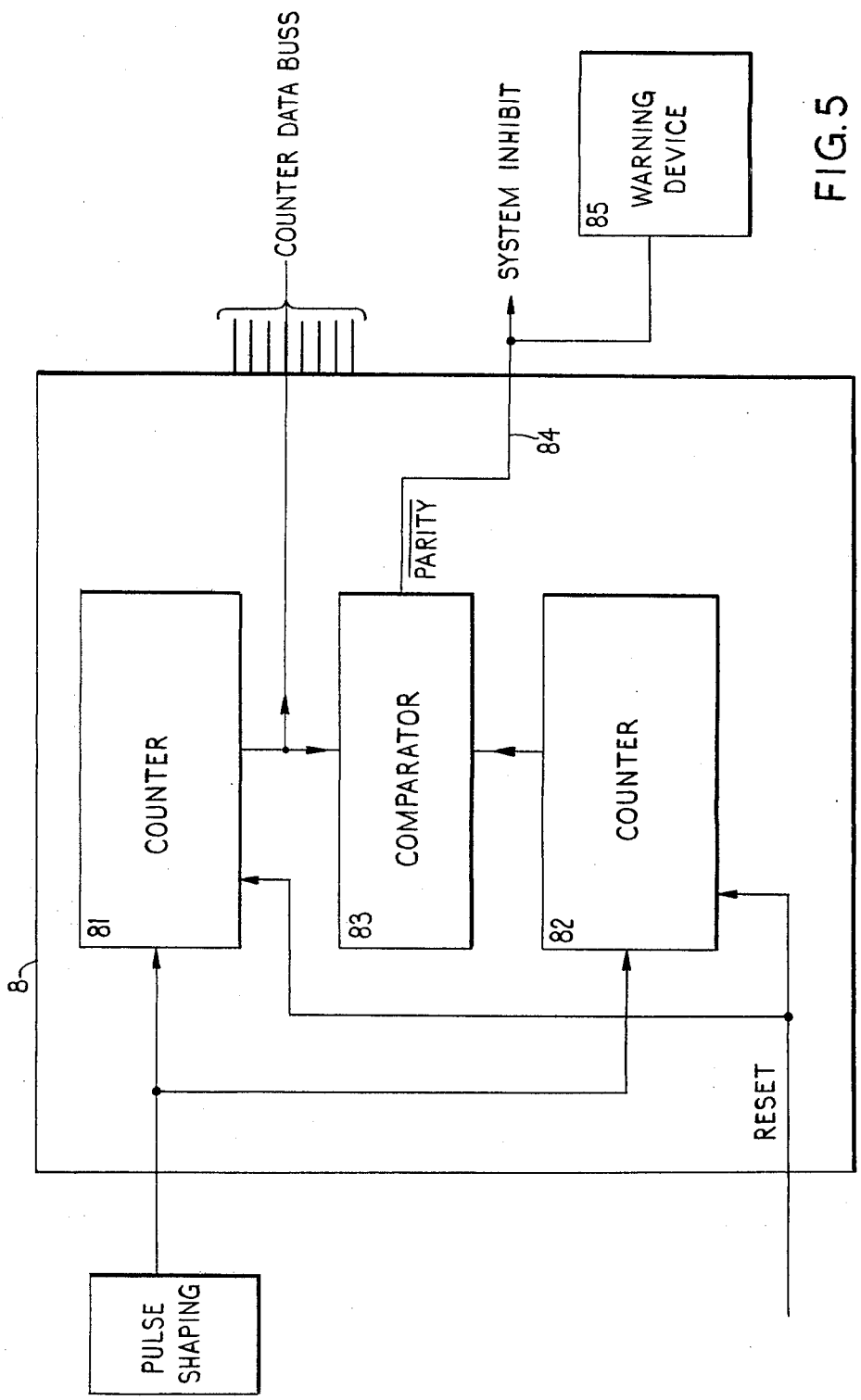
FIG. 5 is a block diagram illustrating the counter assembly in more detail.

For further understanding of the means of obtaining a high integrity for the performance of the system, reference is made to FIG. 5, wherein the counter means 8 is divided into two separate counters 81 and 82, both driven in parallel from the pulse shaping means 6 and both reset by means of the pulse shaper 7. In addition, there is a comparator 83 which compares the instantaneous numbers in each of the two counters 81 and 82. Providing there is parity between these two numbers in the said counters then there is no signal on the line 84. Should, however, there be a discrepancy between the numbers in the two counters then a signal will be produced by the comparator 83 on line 84, which will cause a warning on the warning device 85 and if required, inhibit the system from further operation. The signal of the counter data going to the comparator 9 is taken from the output of counter 81 since by definition the number in counter 81 and counter 82 is identical for normal operation.

Modification of the phasing of the start and finish point of any machine event or function is made as a result of an operator inspecting the performance of the machine being controlled and the quality of the items being made or processed by such machine at several stages in the process, such modifications being made to achieve the desired performance or quality. In this way the control system operates as a closed loop with the operator providing the feedback. However, in some applications the feedback will be provided by automatic means. Such means may comprise sensors which monitor the deviation of the performance of the apparatus being controlled from that or the deviation of quality of items when made from that required, required, at various stages in the process and means responsive to signals from such sensors to enter modifying data in a corrective sense into the memory 10 via the data entry line 17. By this arrangement, an automatic closed loop control system is realized. In the example of controlling glass forming apparatus, parameters such as a. the weight of gobs of glass,
b. their hardness or other physical quality,
c. the blown size of the glass,
d. physical imperfections of the glass product, may be among those sensed for automatic correction of the phasing of the relevant event in the machine cycle.

Figure 3:
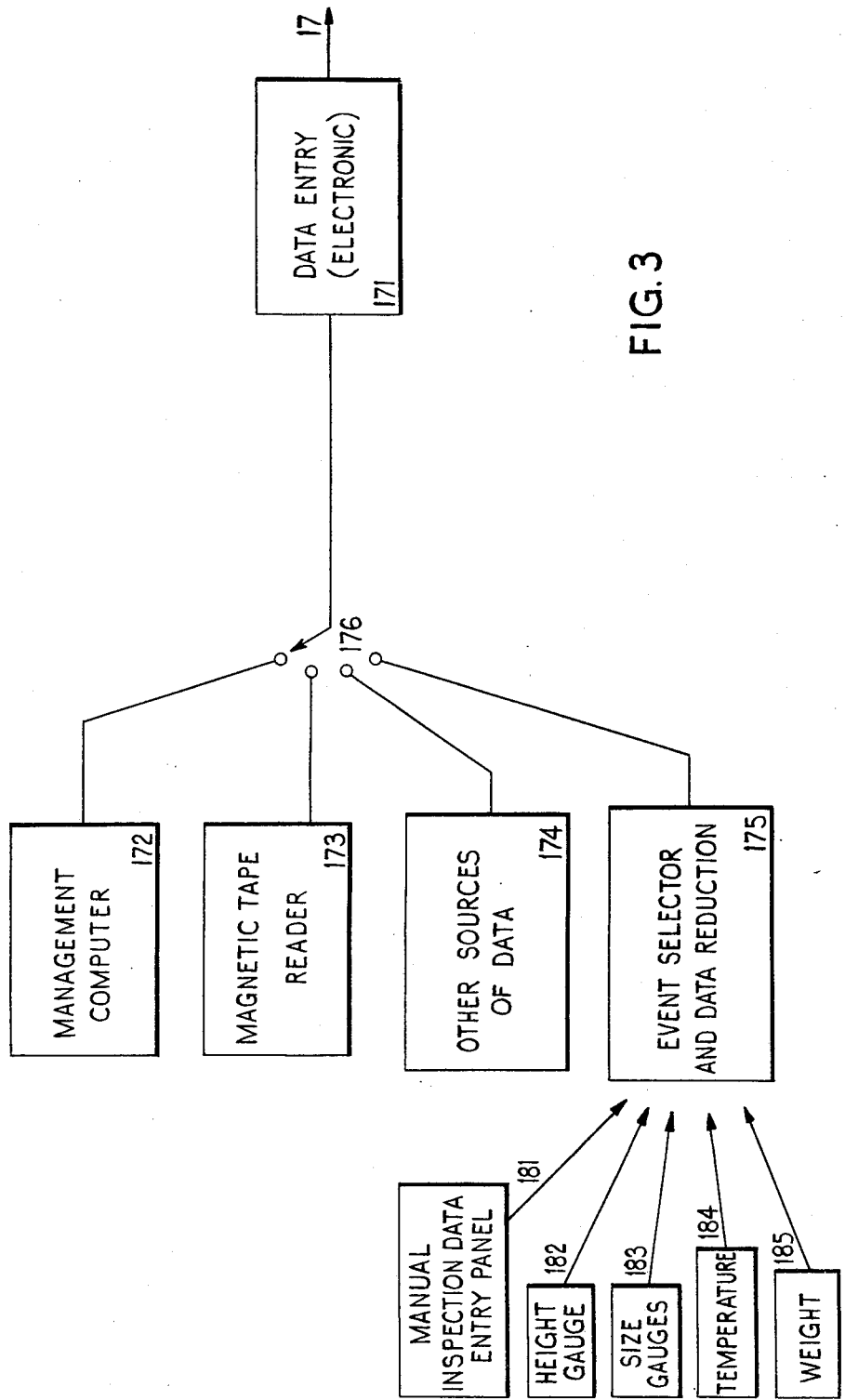
FIG. 3 is a block diagram illustrating the data entry arrangements in more detail.

Referring to FIG. 3, the data at information address location within the memory means 10 can be modified via the manual insertion data entry panel 181 into the event selector and data reduction means 175 through the selector switch 176 appropriately positioned to feed information via the data entry means 17 according to the method previously described.

Additional physical parameters of the products being produced by the equipment being controlled, which may be a glass making machine, and may include such features as height, size, temperature and weight, can be monitored by gauges and instruments either individually or collectively. Instruments envisaged are: a height gauge 182, a size gauge 183, a temperature sensing device 184, a weight evaluating gauge 185. The events which will be affected by the signals produced from such gauges or measuring instruments are determined in the event selector data reduction means 175 and modifying signals for the appropriate data changes for the particular locations in the memory means 10 will be determined and said signals passed via the selector switch 176 into the data entry (electronic) means 17 for operation in the way previously described.

What I claim is:

1. A process control system for controlling a repetitive process in which a plurality of machine events that are not interdependent in the first order take place during different phases of a total machine cycle of operation, comprising two transducers each responsive to a rotating machine member to generate electrical pulses, the first transducer generating a single reference pulse for each complete machine cycle and the second transducer generating a large number of marker pulses at short intervals between consecutive reference pulses, a counter driven by the marker pulse output of the second transducer, a memory to store the count numbers at which specific machine events are to occur, interrogation means interrogating the whole memory upon the occurrence of each marker pulse, comparator means comparing the memory output when so interrogated with the instantaneous count value in the counter, and a series of output stages arranged to deliver output signals for initiating machine events according to the coincidence of number values in the counter with stored values from the memory, the pulses from the first transducer being employed to reset the counter at the end of each complete cycle.

2. A system according to claim 1, wherein each output stage relates to a particular machine function and has two output states, e.g. 'start' and 'finish' and the memory has in store at an address location specific to each output stage, two count numbers representing instants during the machine cycle at which said two output states are to be initiated.

3. A system according to claim 1, wherein the memory is electronic and comprising manual data entry means coupled by data entry control circuitry to the memory for setting in 'start' and finish' data for each machine event.

4. A system according to claim 3, further comprising display means displaying the data in memory at any specific location addressed by the data entry control circuitry.

5. A system according to claim 1, comprising a data link and data entry control circuitry whereby data determining the occurrence of the machine events may be entered into the memory from a management computer, or as corrective feedback from the machine controlled.

6. A system according to claim 5, wherein selected parameters of the machine process are monitored by sensors and corrective data is derived in response to the sensor output signals for modifying the memory data store via said data link.

7. A system according to claim 1, wherein the counter is in two parallel sections both driven simultaneously by the marker pulse output of the second transducer and a comparator continuously or repeatedly compares the counts in the two sections, a system inhibit signal being generated if the counts differ.

8. A system according to claim 1, wherein the rotating machine member to which the first transducer is responsive is in two parts geared together, and the transducer is a two-part electronic transducer generating two trains of pulses in response to the rotation of said two machine parts and detecting and delivering its output at coincidence of the pulses in said two trains.

9. Glass forming machinery having a control system according to claim 1.

* * * * *

UNITED STATES PATENT OFFICE
CERTIFICATE OF CORRECTION

Patent No. 3,674,432            Dated July 4, 1972

Inventor(s) John L. Margrave et al

It is certified that error appears in the above-identified patent and that said Letters Patent are hereby corrected as shown below:

Column 4, line 63, "at" should read -- as --

Column 5, line 6, "atoms" should read -- atom --

Column 7, line 50, "insert" should read -- inert --

Column 9, line 2, "flourine" should read -- fluorine --

Column 9, line 47, "flourine" should read -- fluorine --

Column 10, line 12, "flourine" should read -- fluorine --

Column 11, line 59, "paration of carbon monofluorides, where no heat is added" should be deleted.

Column 14, line 65, "Graphic" should read -- Graphite --

Signed and sealed this 26th day of December 1972.

(SEAL)
Attest:

EDWARD M. FLETCHER, JR.            ROBERT GOTTSCHALK
Attesting Officer            Commissioner of Patents